(No Model.) 2 Sheets—Sheet 1.
W. K. MILLHOLLAND.
ADJUSTING DEVICE FOR JOURNAL BEARINGS.
No. 512,984. Patented Jan. 16, 1894.
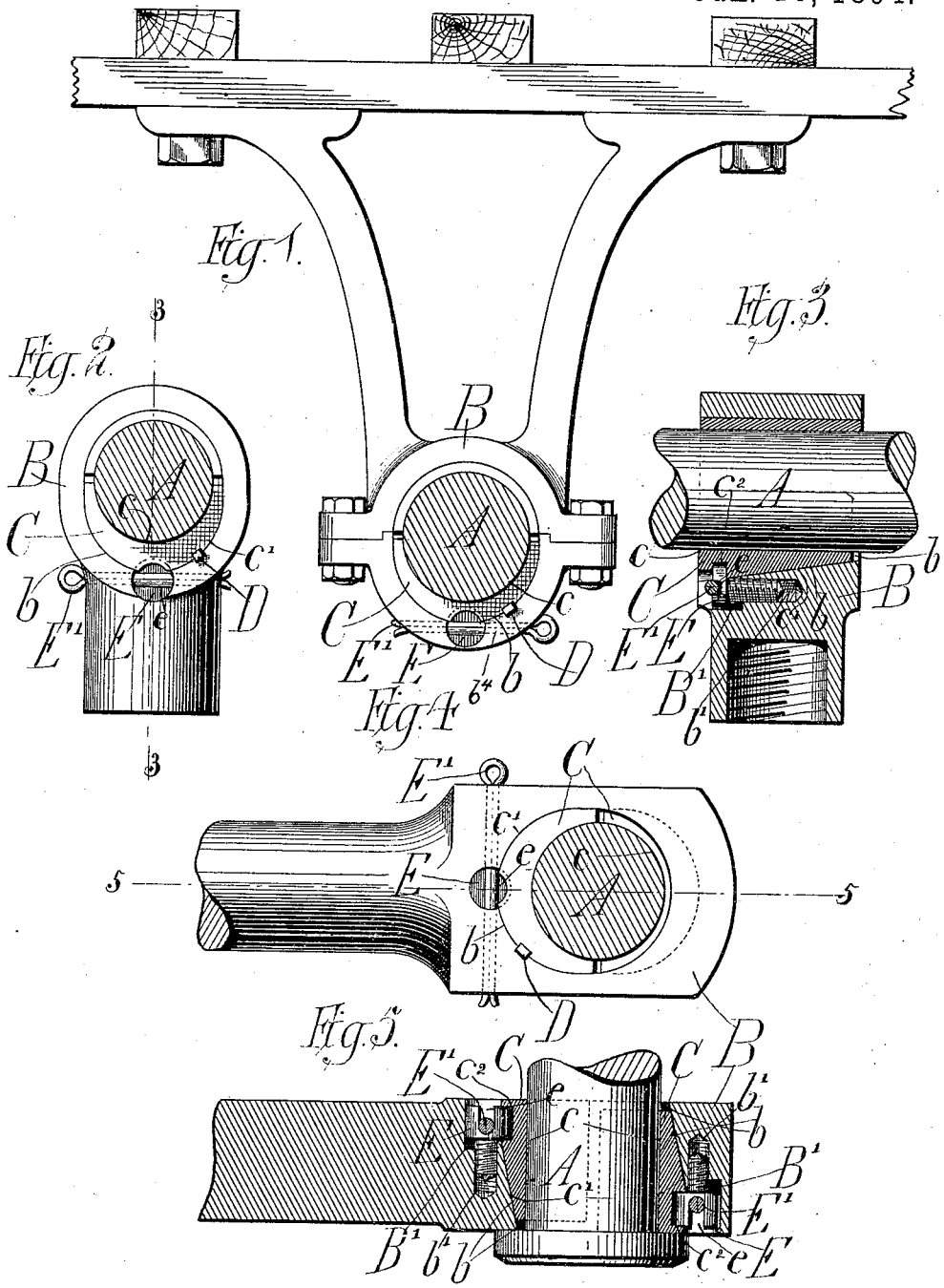
Witnesses,
C. E. Tomlinson.
Louis M. F. Whitehead.
Inventor,
William K. Millholland
by Dayton, Poole & Brown
Attys.

(No Model.) 2 Sheets—Sheet 2.
W. K. MILLHOLLAND.
ADJUSTING DEVICE FOR JOURNAL BEARINGS.
No. 512,984. Patented Jan. 16, 1894.
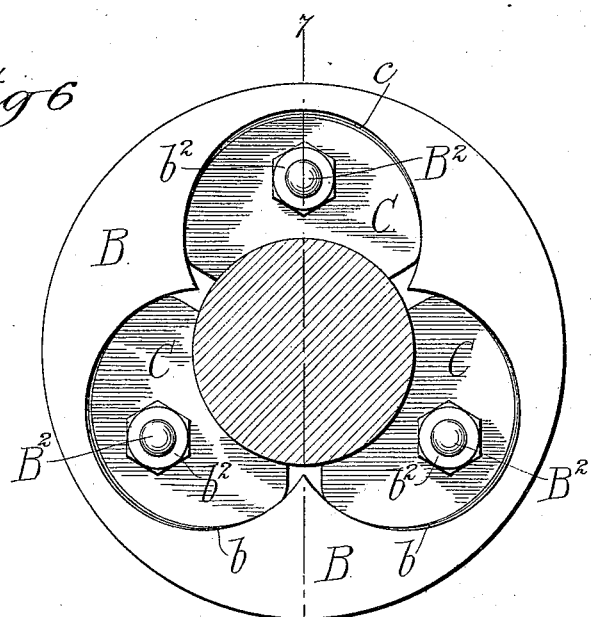
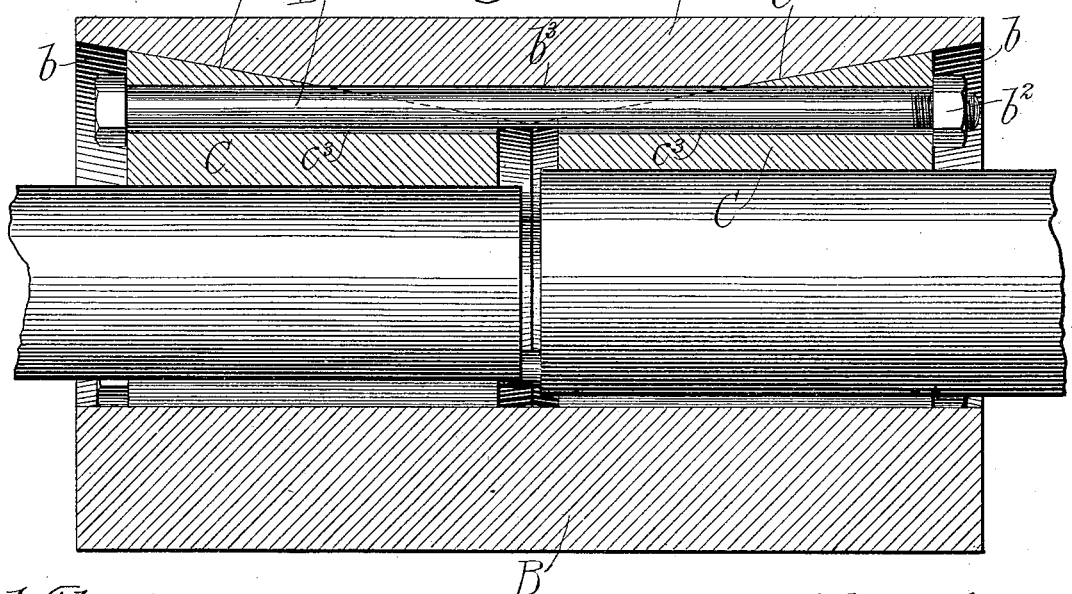
Witnesses
Inventor
William K. Millholland.
by Dayton, Poole & Brown
Att'ys
THE NATIONAL LITHOGRAPHING COMPANY,
WASHINGTON, D. C.

UNITED STATES PATENT OFFICE.

WILLIAM KNOX MILLHOLLAND, OF AUSTIN, ILLINOIS.

ADJUSTING DEVICE FOR JOURNAL-BEARINGS.

SPECIFICATION forming part of Letters Patent No. 512,984, dated January 16, 1894.

Application filed October 17, 1892. Serial No. 449,095. (No model.)

*To all whom it may concern:*

Be it known that I, WILLIAM KNOX MILLHOLLAND, of Austin, in the county of Cook and State of Illinois, have invented certain new and useful Improvements in Adjusting Devices for Journal-Bearings and the Like; and I do hereby declare that the following is a full, clear, and exact description thereof, reference being had to the accompanying drawings, and to the letters of reference marked thereon, which form a part of this specification.

This invention relates to improvements in adjustable bushings adapted to meet the requirements of journal bearings, shaft couplings, &c.

The object of the invention is to provide an improved construction in devices of the character referred to, and it consists in the matters hereinafter set forth and particularly pointed out in the appended claims.

A construction embodying my invention comprises, as its essential features, an encircling member or supporting sleeve, through which the shaft is adapted to pass, and a portion or portions of the inner surface of which are bored out cylindrically upon axes which are inclined to the axis of the journal or shaft, and one or more wedge shaped blocks, the outer surfaces of which are shaped to accurately fit said inclined cylindrically bored portions, and the inner surfaces of which are adapted to engage the shaft, said block or blocks being movable longitudinally with relation to the said sleeve.

In the drawings Figure 1 is a side elevation of a hanger provided with a bearing embodying my improvements. Fig. 2 is a similar view of bearing designed for attachment to a post or bracket. Fig. 3 is a vertical section on line 3—3 of Fig. 2. Fig. 4 is a side elevation of a pitman provided with a bearing embodying my improvements. Fig. 5 is a section on line 5—5 of Fig. 4. Fig. 6 is an end view of a shaft-coupling embodying my invention. Fig. 7 is a longitudinal section on line 7—7 of Fig. 6.

Referring first more particularly to the journal bearing illustrated in Figs. 1, 2 and 3, A designates the shaft or journal and B the supporting sleeve encircling the same and which, obviously, may form a part of any mechanical structure, it being shown in Fig. 1 as part of an ordinary shafting hanger, and in Figs. 2 and 3 as adapted to be screwed upon, or otherwise attached to, any suitable post or standard. The lower half $b$, in this instance, of the inner surface of said sleeve B is bored out cylindrically upon an axis which lies in the same plane with but is inclined to the axis of the shaft A, leaving a tapered aperture between the adjacent surfaces of the sleeve and shaft within which a wedge shaped bearing block C is inserted, said block being formed to exactly fit said adjacent surfaces of the sleeve and shaft. The other half of the inner surface of said sleeve is, in this instance, bored out concentrically with the shaft A and forms itself the upper half bearing for said shaft. Those parts of the journal bearing which engage the shaft may obviously be lined with any suitable anti-friction metal or alloy, and the bearing-block C may conveniently be entirely composed of such material if desired. Said block is herein shown secured against rotation with the sleeve B by a suitable key D. The bearing thus formed is adjusted by the endwise movement of the bearing-block C, as a ready and positive means of effecting which the supporting sleeve B is provided, adjacent to the aperture $b$, with a tapped hole $b'$ which is engaged by an adjusting screw E, the outer end of said adjusting screw being connected with the wedge-blocks C, that the latter will be moved endwise as the screw is turned. Such connection is herein shown as conveniently formed by providing said adjusting screw with an enlarged head which engages a transverse notch $c^2$ in the adjacent face $c'$ of the block C, the hole $b'$ being countersunk as shown to receive the head of the screw. Obviously, with this construction, the turning of the screw E in either direction will move the bearing block B longitudinally upon its inclined bed and thereby the inner face $c$ of said block will be carried toward or from the opposite side of the bearing, as the case may be.

A pin or cotter E' inserted in any one of a series of transversely arranged holes $b^4$ provided in the sleeves B, and engaging the slot in the head of the screw E, serves to secure said screw against accidental movement. By placing said cotter in one or the other of said holes $b^4$ it may be made to engage said slot $e$ throughout the entire range of adjustment of the screw.

The journal bearing illustrated in Figs. 4 and 5 (in which the sleeve B is shown as forming the stub end of a pitman or connecting rod) is similar in construction to that hereinafter described except that, in this case the sleeve B is bored out cylindrically on inclined axes at two sides instead of one, and is provided with two wedge-shaped bearing-blocks C arranged on opposite sides of the shaft A. In the form shown, said bearing-blocks C are arranged oppositely with regard to their tapered form, one being inserted from one face of the sleeve B and the other from the opposite face of said sleeve, but it is obvious that said sleeve may be so bored out as to require the insertion of both blocks from the same face of said sleeve, if so desired. The longitudinal adjustment of each of the wedge-shaped blocks in this form of bearing is herein shown as effected in the same manner as in the bearing shown in Figs. 1, 2 and 3. Only a single aperture $b^4$ is, however, provided for the locking pin or cotter E', the head of the screw E and slot $e$ being made deep enough to register with said aperture $b_t$ throughout the entire range of adjustment of said screw.

In Figs. 6 and 7, I have shown a bushing constructed in accordance with my invention and adapted to the requirements of a shaft-coupling, the inner surface of the encircling member or sleeve B, in this case, being bored out cylindrically from each end upon a plurality of inclined axes converging toward the opposite end of said sleeve. In the form shown said sleeve is so bored out to form a trifoliate aperture converging from each end of the sleeve toward the middle thereof, and within each of the three parts of said aperture at each end a wedge-shaped bearing-block C is fitted in the manner hereinbefore described. Said wedge-blocks may be arranged to be adjusted independently by means similar to that shown in Figs. 1 to 5, but in this instance I have shown each pair of corresponding blocks at opposite ends of the sleeve as connected by a longitudinal bolt $B^2$ engaging suitable apertures $c^3$ in said blocks and provided with an adjusting nut $b^2$ by means of which said blocks may be drawn together. Suitable apertures $b^3$ in the sleeve B permit the passage of said bolts $B^2$ and prevent the displacement of the blocks through torsional strain on the shaft held between them, thereby permitting the keys D, shown in Figs. 1 to 5 to be dispensed with. Obviously both ends of the bolts $B^2$ may be provided with adjusting nuts if so desired.

The inner faces of the co-operating wedge-blocks at each end of the coupling may be formed or dressed to fit the same or different sizes of shaft, and, obviously, may if desired, differ in cross-sectional contour, so that the coupling may be used to join, for example, a square and a cylindric shaft, or two shafts of any other desired similar or differing cross-section.

What I claim is—

1. An adjustable bushing for journal bearings, shaft couplings &c., comprising an encircling sleeve through which the shaft is adapted to pass and a portion of the inner surface of which sleeve has a cylindric bore upon an axis which is inclined to the axis of the shaft, and a bearing block adapted to fit between said portion and the adjacent surface of the shaft, substantially as described.

2. An adjustable bushing for journal bearings, shaft couplings &c., comprising an encircling sleeve through which the shaft is adapted to pass and a portion of the inner surface of which sleeve has a cylindric bore upon an axis which is inclined to the axis of the shaft, a bearing block adapted to fit between said portion and the adjacent surface of the shaft and means for adjusting said bearing blocks longitudinally, substantially as described.

3. A journal bearing comprising a supporting sleeve through which the journal is adapted to pass and a portion of the inner surface of which sleeve has a cylindric bore upon an axis which is inclined to the axis of the shaft, a bearing block adapted to fit between said portion and the adjacent surface of the shaft, said bearing block being provided with a transverse notch and said sleeve with a tapped aperture, and an adjusting screw seated in said tapped aperture with its head engaging said transverse notch, substantially as described.

4. A journal bearing comprising a supporting sleeve through which the journal is adapted to pass and a portion of the inner surface of which sleeve has a cylindric bore upon an axis which is inclined to the axis of the shaft, a bearing block adapted to fit between said portion and the adjacent surface of the shaft, an adjusting screw engaging said support and bearing block, and a locking pin engaging an aperture in the hanger and an aperture in the adjacent screw to normally maintain the latter against rotation, substantially as described.

5. A journal bearing comprising a supporting sleeve through which the journal is adapted to pass and a portion of the inner surface of which sleeve has a cylindric bore upon an axis of the shaft, a bearing block adapted to fit between said portion and the adjacent surface of the shaft, an adjusting screw engaging the sleeve and bearing block, and a locking pin engaging an aperture in said sleeve and a transverse slot in the end of said adjusting screw, said slot being of sufficient depth to register with the pin engaging aperture of the sleeve throughout the entire range of adjustment of said screw, substantially as described.

In testimony that I claim the foregoing as my invention I affix my signature in presence of two witnesses.

WILLIAM KNOX MILLHOLLAND.

Witnesses:
HENRY F. FRINK,
C. S. CASTLE.